(12) United States Patent
Gartung et al.

(10) Patent No.: US 6,321,241 B1
(45) Date of Patent: *Nov. 20, 2001

(54) CROSS TAB ANALYSIS AND REPORTING METHOD

(75) Inventors: Daniel L. Gartung, Sunnyvale; Yorgen H. Edholm, Palo Alto; Kay-Martin Edholm, Sunnyvale; Kristen N. McNall, Mountain View; Karl M. Lew, Sunnyvale, all of CA (US)

(73) Assignee: Brio Technology, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/109,552

(22) Filed: Jul. 2, 1998

Related U.S. Application Data

(63) Continuation of application No. 08/772,830, filed on Dec. 24, 1996, now Pat. No. 5,915,257, which is a continuation of application No. 08/320,635, filed on Oct. 11, 1994, now abandoned.

(51) Int. Cl.[7] .............................. G06F 17/30; G06F 7/00; G06T 11/20
(52) U.S. Cl. .............................. 707/503; 707/2; 707/102; 345/440
(58) Field of Search .............................. 707/503, 2, 205, 707/4, 102, 203; 345/440, 427

(56) References Cited

U.S. PATENT DOCUMENTS

| | | | |
|---|---|---|---|
| 5,359,724 | 10/1994 | Earle | 707/205 |
| 5,406,477 | 4/1995 | Harhen | 703/6 |
| 5,421,008 | 5/1995 | Banning et al. | 707/4 |
| 5,440,730 | 8/1995 | Elmasri et al. | 707/203 |
| 5,442,784 | 8/1995 | Powers et al. | 707/102 |
| 5,442,786 | 8/1995 | Bowen | 707/102 |
| 5,446,886 | 8/1995 | Li | 707/2 |
| 5,471,611 | 11/1995 | McGregor | 707/4 |
| 5,555,354 | 9/1996 | Strasnick et al. | 345/427 |
| 5,604,854 | 2/1997 | Glassey | 707/503 |
| 5,845,276 | * 12/1998 | Emerson et al. | 707/2 |
| 5,880,742 | * 3/1999 | Rao et al. | 345/440 |
| 5,915,257 | * 6/1999 | Gartung et al. | 707/503 |

OTHER PUBLICATIONS

Brio Technology, Inc., *DataPivot Reference& User's Guide*, Version 1.0, Palo Alto, California, 1991.

(List continued on next page.)

Primary Examiner—Stephen S. Hong
Assistant Examiner—William L. Bashore
(74) Attorney, Agent, or Firm—Haverstock & Owens LLP

(57) ABSTRACT

A method of and apparatus for preparing and modifying cross-tabulation analysis and reporting utilizes a data structure for storing aggregate data, gathered or input from a stream of data records. The data structure stores the aggregates of the data values, so that as cross-tab reports are generated, access to the original stream of data records is not necessary. Preferably, a tree-type data structure is utilized. The tree-type data structure is arranged relative to a root. The root of the tree is the first node in the tree. It has no parent node and no sibling nodes. Directly related to the root of the tree are labels of a first level. Labels of a second level and then labels of succeeding levels may follow, as required. Each level includes multiple nodes corresponding to the arrangement of the data. Each node has an array of accompanying cell in which the aggregates of the data values are stored. As the cross-tab report is modified, the tree-type data structure is also correspondingly modified by either changing the pointers between levels and nodes or by rearranging the levels. The aggregate values are then updated accordingly. A cross-tree is also maintained with the same structure as the main tree except that the cross-tree does not include the side label levels or nodes. When the labels of the cross-tab report are rearranged or removed, preferably the data structure is modified in place. Alternatively, a separate data structure may be constructed from the original data structure.

26 Claims, 10 Drawing Sheets

Microfiche Appendix Included
(4 Microfiche, 185 Pages)

OTHER PUBLICATIONS

Brio Technology, Inc., *DataPivot Reference and User's Guide*, Version 1.1, Palo Alto California, 1992.

Brio Technology, Inc., *DataPivot Reference and User's Guide*, Version 1.5, 1993.

Borland, *Quattro Pro for Windows Version 5.0 User Manual*, 1993, p.219, 220, 230, 231, 371–409.

Knuth, *The Art of Computer Programming* Second Edition, vol. 1 Fundamental Algorithms, 1973, p. 305–310, 332–336, 347–350.

Celko, "DataPivot 1.1," *DBMS* v.6, n.1, Jan. 1993, p. 30–32.

Benjamin, "DataPivot," *MacUser*, v.8, n.5, May 1992, p. 46–48.

Staff, "Swinging Data," *MacUser*, v.8, n.2, Feb. 1992, p. 44.

Sullivan, "Analytical Ability Marks QP/W Upgrade," *PC Week*, v.10, n.23, Jun. 14, 1993, p. 1–2.

Spector, "Forest & Trees Reads More Data," *PC World*, v.11, n.2, Feb. 1993, p. 98.

* cited by examiner

CROSS TAB ANALYSIS AND REPORTING METHOD

This application is a continuation of U.S. patent application Ser. No. 08/772,830 filed on Dec. 24, 1996 now U.S. Pat. No. 5,915,257 which is a File Wrapper Continuation application of U.S. patent application Ser. No. 08/320,635 filed Oct. 1, 1994 now abandoned.

MICROFICHE APPENDIX

A z-interface library for the present invention is included as a microfiche appendix in Appendix A. Appendix A includes 2 microfiche with 88 frames. A software code listing in the C language for the present invention is included as a microfiche appendix in Appendix B. Appendix B includes 2 microfiche with 97 frames.

COPYRIGHT

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates to the field of cross-tabulation analysis and reporting of tabular-styled data on a two dimensional array. More particularly, the present invention relates to the field of rapidly interchanging the compilation and presentation of data resulting from moving a label between a row and a column.

BACKGROUND OF THE INVENTION

As the amount of data available on personal computers increases, the need for rich, fast and powerful analysis tools has become critical. A standard analysis tool currently available and commonly used is a spreadsheet. The classical spreadsheet is a good tool to do formulaic analysis of fixed size data. However, when the data is of varying size, or if cross-tabulation based analysis is needed, the classical spreadsheet is inadequate.

Current spreadsheets typically include the ability to cross-tabulate or pivot rows or columns of a report. A spreadsheet add-on tool entitled DataPivot® was the pioneer of this capability to restructure data and reports. DataPivot® is a registered trademark of Brio Technology, Inc. of 444 Castro Street, Suite 700, Mountain View, Calif. Other major spreadsheet programs have also now added this ability to cross-tabulate or pivot data. The DataPivot Reference and User's Guide published by Brio Technology, Inc. of 444 Castro Street, Suite 700, Mountain View, Calif. is attached hereto as Appendix C.

Cross-tabulation analysis allows a user to dynamically restructure data. Consider as an example the rows of source data contained in Table 1:

TABLE 1

Example Data For Reports

| Year | Quarter | Winery | Grape | Cases Sold |
|---|---|---|---|---|
| 1991 | Q1 | Beaulieu | Cabernet Sauvignon | 450 |
| 1991 | Q2 | Beaulieu | Cabernet Sauvignon | 550 |
| 1991 | Q3 | Beaulieu | Cabernet Sauvignon | 575 |
| 1991 | Q4 | Beaulieu | Cabernet Sauvignon | 650 |
| 1991 | Q1 | Beaulieu | Cabernet Sauvignon | 320 |
| 1991 | Q2 | Beaulieu | Cabernet Sauvignon | 325 |
| 1991 | Q3 | Beaulieu | Cabernet Sauvignon | 330 |
| 1991 | Q4 | Beaulieu | Cabernet Sauvignon | 350 |
| 1991 | Q1 | Beaulieu | Cabernet Sauvignon | 350 |
| 1991 | Q2 | Beaulieu | Cabernet Sauvignon | 360 |
| 1991 | Q3 | Beaulieu | Cabernet Sauvignon | 370 |
| 1991 | Q4 | Beaulieu | Cabernet Sauvignon | 375 |
| 1991 | Q1 | Beaulieu | Cabernet Sauvignon | 230 |
| 1991 | Q2 | Beaulieu | Cabernet Sauvignon | 235 |
| 1991 | Q3 | Beaulieu | Cabernet Sauvignon | 240 |
| 1991 | Q4 | Beaulieu | Cabernet Sauvignon | 260 |
| 1992 | Q2 | Beaulieu | Cabernet Sauvignon | 625 |
| 1992 | Q4 | Beaulieu | Cabernet Sauvignon | 670 |
| 1992 | Q1 | Beaulieu | Cabernet Sauvignon | 310 |
| 1992 | Q2 | Beaulieu | Cabernet Sauvignon | 314 |
| 1992 | Q3 | Beaulieu | Cabernet Sauvignon | 324 |
| 1992 | Q4 | Beaulieu | Cabernet Sauvignon | 388 |
| 1992 | Q1 | Beaulieu | Cabernet Sauvignon | 620 |
| 1992 | Q1 | Beaulieu | Cabernet Sauvignon | 400 |
| 1992 | Q2 | Beaulieu | Cabernet Sauvignon | 411 |
| 1992 | Q3 | Beaulieu | Cabernet Sauvignon | 419 |
| 1992 | Q4 | Beaulieu | Cabernet Sauvignon | 423 |
| 1992 | Q1 | Beaulieu | Cabernet Sauvignon | 200 |
| 1992 | Q2 | Beaulieu | Cabernet Sauvignon | 213 |
| 1992 | Q3 | Beaulieu | Cabernet Sauvignon | 223 |
| 1992 | Q3 | Beaulieu | Cabernet Sauvignon | 650 |
| 1992 | Q4 | Beaulieu | Cabernet Sauvignon | 233 |
| 1991 | Q2 | Beaulieu | Chardonnay | 425 |
| 1991 | Q3 | Beaulieu | Chardonnay | 460 |
| 1991 | Q4 | Beaulieu | Chardonnay | 450 |
| 1991 | Q1 | Beaulieu | Chardonnay | 230 |
| 1991 | Q2 | Beaulieu | Chardonnay | 235 |
| 1991 | Q3 | Beaulieu | Chardonnay | 240 |
| 1991 | Q4 | Beaulieu | Chardonnay | 255 |
| 1991 | Q1 | Beaulieu | Chardonnay | 180 |
| 1991 | Q2 | Beaulieu | Chardonnay | 200 |
| 1991 | Q3 | Beaulieu | Chardonnay | 225 |
| 1991 | Q4 | Beaulieu | Chardonnay | 230 |
| 1991 | Q1 | Beaulieu | Chardonnay | 270 |
| 1991 | Q2 | Beaulieu | Chardonnay | 270 |
| 1991 | Q3 | Beaulieu | Chardonnay | 275 |
| 1991 | Q4 | Beaulieu | Chardonnay | 290 |
| 1991 | Q1 | Beaulieu | Chardonnay | 450 |
| 1992 | Q1 | Beaulieu | Chardonnay | 400 |
| 1992 | Q2 | Beaulieu | Chardonnay | 411 |
| 1992 | Q3 | Beaulieu | Chardonnay | 415 |
| 1992 | Q4 | Beaulieu | Chardonnay | 419 |
| 1992 | Q1 | Beaulieu | Chardonnay | 200 |
| 1992 | Q2 | Beaulieu | Chardonnay | 201 |
| 1992 | Q3 | Beaulieu | Chardonnay | 208 |
| 1992 | Q4 | Beaulieu | Chardonnay | 220 |
| 1992 | Q1 | Beaulieu | Chardonnay | 170 |
| 1992 | Q2 | Beaulieu | Chardonnay | 175 |
| 1992 | Q3 | Beaulieu | Chardonnay | 180 |
| 1992 | Q4 | Beaulieu | Chardonnay | 175 |
| 1992 | Q1 | Beaulieu | Chardonnay | 230 |
| 1992 | Q2 | Beaulieu | Chardonnay | 232 |
| 1992 | Q3 | Beaulieu | Chardonnay | 219 |
| 1992 | Q4 | Beaulieu | Chardonnay | 225 |
| 1991 | Q1 | Beaulieu | Merlot | 180 |
| 1991 | Q2 | Duckhorn | Merlot | 660 |
| 1991 | Q3 | Duckhorn | Merlot | 665 |
| 1991 | Q4 | Duckhorn | Merlot | 670 |
| 1991 | Q1 | Duckhorn | Merlot | 325 |
| 1991 | Q2 | Duckhorn | Merlot | 329 |
| 1991 | Q3 | Duckhorn | Merlot | 330 |
| 1991 | Q4 | Duckhorn | Merlot | 341 |
| 1991 | Q1 | Duckhorn | Merlot | 660 |
| 1991 | Q3 | Beaulieu | Merlot | 350 |
| 1991 | Q2 | Beaulieu | Merlot | 325 |

TABLE 1-continued

Example Data For Reports

| Year | Quarter | Winery | Grape | Cases Sold |
|---|---|---|---|---|
| 1991 | Q1 | Beaulieu | Merlot | 320 |
| 1991 | Q4 | Beaulieu | Merlot | 650 |
| 1991 | Q3 | Beaulieu | Merlot | 625 |
| 1991 | Q2 | Beaulieu | Merlot | 575 |
| 1991 | Q1 | Beaulieu | Merlot | 550 |
| 1991 | Q4 | Beaulieu | Merlot | 280 |
| 1991 | Q3 | Beaulieu | Merlot | 230 |
| 1991 | Q2 | Beaulieu | Merlot | 275 |
| 1991 | Q1 | Beaulieu | Merlot | 270 |
| 1991 | Q4 | Beaulieu | Merlot | 200 |
| 1991 | Q3 | Beaulieu | Merlot | 195 |
| 1991 | Q2 | Beaulieu | Merlot | 190 |
| 1991 | Q2 | Duckhorn | Merlot | 481 |
| 1991 | Q3 | Duckhorn | Merlot | 485 |
| 1991 | Q4 | Duckhorn | Merlot | 499 |
| 1991 | Q1 | Duckhorn | Merlot | 275 |
| 1991 | Q2 | Duckhorn | Merlot | 280 |
| 1991 | Q3 | Duckhorn | Merlot | 285 |
| 1991 | Q4 | Duckhorn | Merlot | 289 |
| 1991 | Q1 | Duckhorn | Merlot | 200 |
| 1991 | Q2 | Duckhorn | Merlot | 206 |
| 1991 | Q3 | Duckhorn | Merlot | 212 |
| 1991 | Q4 | Duckhorn | Merlot | 220 |
| 1991 | Q1 | Duckhorn | Merlot | 289 |
| 1991 | Q2 | Duckhorn | Merlot | 287 |
| 1991 | Q3 | Duckhorn | Merlot | 291 |
| 1991 | Q4 | Duckhorn | Merlot | 301 |
| 1991 | Q1 | Duckhorn | Merlot | 480 |
| 1991 | Q4 | Beaulieu | Merlot | 370 |
| 1992 | Q2 | Duckhorn | Merlot | 691 |
| 1992 | Q1 | Beaulieu | Merlot | 620 |
| 1992 | Q4 | Beaulieu | Merlot | 244 |
| 1992 | Q3 | Beaulieu | Merlot | 234 |
| 1992 | Q2 | Beaulieu | Merlot | 232 |
| 1992 | Q1 | Beaulieu | Merlot | 230 |
| 1992 | Q4 | Beaulieu | Merlot | 181 |
| 1992 | Q3 | Beaulieu | Merlot | 178 |
| 1992 | Q2 | Beaulieu | Merlot | 171 |

TABLE 1-continued

Example Data For Reports

| Year | Quarter | Winery | Grape | Cases Sold |
|---|---|---|---|---|
| 1992 | Q1 | Beaulieu | Merlot | 170 |
| 1992 | Q2 | Beaulieu | Merlot | 621 |
| 1992 | Q3 | Beaulieu | Merlot | 655 |
| 1992 | Q4 | Beaulieu | Merlot | 645 |
| 1992 | Q1 | Beaulieu | Merlot | 310 |
| 1992 | Q2 | Beaulieu | Merlot | 321 |
| 1992 | Q3 | Beaulieu | Merlot | 315 |
| 1992 | Q4 | Beaulieu | Merlot | 330 |
| 1992 | Q1 | Duckhorn | Merlot | 690 |
| 1992 | Q4 | Duckhorn | Merlot | 280 |

TABLE 1-continued

Example Data For Reports

| Year | Quarter | Winery | Grape | Cases Sold |
|---|---|---|---|---|
| 1992 | Q3 | Duckhorn | Merlot | 275 |
| 1992 | Q2 | Duckhorn | Merlot | 273 |
| 1992 | Q1 | Duckhorn | Merlot | 270 |
| 1992 | Q4 | Duckhorn | Merlot | 198 |
| 1992 | Q3 | Duckhorn | Merlot | 195 |
| 1992 | Q2 | Duckhorn | Merlot | 191 |
| 1992 | Q1 | Duckhorn | Merlot | 190 |
| 1992 | Q4 | Duckhorn | Merlot | 301 |
| 1992 | Q3 | Duckhorn | Merlot | 295 |
| 1992 | Q2 | Duckhorn | Merlot | 291 |
| 1992 | Q1 | Duckhorn | Merlot | 290 |
| 1992 | Q4 | Duckhorn | Merlot | 510 |
| 1992 | Q3 | Duckhorn | Merlot | 508 |
| 1992 | Q2 | Duckhorn | Merlot | 502 |
| 1992 | Q1 | Duckhorn | Merlot | 500 |
| 1992 | Q4 | Duckhorn | Merlot | 360 |
| 1992 | Q3 | Duckhorn | Merlot | 344 |
| 1992 | Q2 | Duckhorn | Merlot | 345 |
| 1992 | Q1 | Duckhorn | Merlot | 340 |
| 1992 | Q4 | Duckhorn | Merlot | 699 |
| 1992 | Q3 | Duckhorn | Merlot | 695 |

The data included in Table 1 may be condensed into the following easy to read cross-tabulated report having the top labels of year and quarter, the side labels of winery and grape and the facts of cases sold. The facts represent the aggregated values in the center of the report displayed as the number of cases of each grape sold in each quarter for each winery.

Report 1

| | | | 1991 | | | | 1992 | | | |
|---|---|---|---|---|---|---|---|---|---|---|
| | | | Q1 | Q2 | Q3 | Q4 | Q1 | Q2 | Q3 | Q4 |
| Beaulieu | Cabernet Sauvignon | Cases Sold | 1350 | 1470 | 1515 | 1635 | 1530 | 1563 | 1616 | 1714 |
| | Chardonnay | Cases Sold | 1130 | 1130 | 1200 | 1225 | 1000 | 1019 | 1022 | 1039 |
| | Merlot | Cases Sold | 1320 | 1365 | 1400 | 1500 | 1330 | 1345 | 1382 | 1400 |
| Duckhorn | Merlot | Cases Sold | 2229 | 2243 | 2268 | 2320 | 2280 | 2293 | 2312 | 2348 |

This same data may also be condensed into the following different cross-tabulated report having the top label of quarter, the side labels of year, winery and grape and the facts of cases sold. The facts still represent the aggregated values in the center of the report displayed as the number of cases each grape sold in each quarter for each winery.

Report 2

| | | | | Q1 | Q2 | Q3 | Q4 |
|---|---|---|---|---|---|---|---|
| 1991 | Beaulieu | Cabernet Sauvignon | Cases Sold | 1350 | 1470 | 1515 | 1635 |
| | | Char- | Cases Sold | 1130 | 1130 | 1200 | 1225 |

-continued

| | | | Report 2 | | | | |
|---|---|---|---|---|---|---|---|
| | | | | Q1 | Q2 | Q3 | Q4 |
| | | donnay | | | | | |
| | | Merlot | Cases Sold | 1320 | 1365 | 1400 | 1500 |
| | Duckhorn | Merlot | Cases Sold | 2229 | 2243 | 2266 | 2320 |
| 1992 | Beaulieu | Cabernet Sauvignon | Cases Sold | 1530 | 1563 | 1616 | 1714 |
| | | Chardonnay | Cases Sold | 1000 | 1019 | 1022 | 1039 |
| | | Merlot | Cases Sold | 1330 | 1345 | 1362 | 1400 |
| | Duckhorn | Merlot | Cases Sold | 2250 | 2293 | 2312 | 2346 |

The only difference between the Report 1 and the Report 2 is the manner in which the data or facts are displayed. The year label was pivoted or rotated from the top of the report, as illustrated in the Report 1, to the side of the report, as illustrated in the Report 2. With a good cross-tabulation tool a user should be able to go between the two reports quickly and easily.

Current cross-tabulation tools will become overloaded if a user attempts to push too much source data through the cross-tabulation engine. Such prior art cross-tabulation engines will become overloaded when users work on 10,000 to 20,000 rows of source data, because these engines rely on access to the rows of source data in order to pivot or rearrange the data for display in a cross-tabulation report. Users who desire to work with this amount of source data are prevented from using the prior art cross-tabulation tools.

The main reason why the cross-tabulation tools of the prior art are unable to manipulate large amounts of data is attributed to the storage structures and the methods employed. While the exact methods are not publicly available, it is believed that the cross-tabulation tools of the prior art are not self-contained, but require complete access to the source data. It is also believed that the cross-tabulation data structures used by the tools of the prior art use either a cached display template or a hashed data storage module. Neither of these data structures provides enough structural information in the cross-tabulation data structure to support arbitrary restructurings without access to the source data.

What is needed is a cross-tabulation tool which pivots and restructures a cross-tabulation report easily and efficiently without requiring access to the source data. What is also needed is a cross-tabulation tool which will accumulate an incoming stream of data records into a data structure which may then be used to form and restructure a cross-tabulation report without the necessity of storing the stream of data records into a computer's memory for later access by the cross-tabulation tool.

SUMMARY OF THE INVENTION

A method of and apparatus for preparing and modifying cross-tabulation analysis and reporting utilizes a data structure for storing aggregate data, gathered or input from a stream of data records. The data structure stores the aggregates of the data values, so that as cross-tab reports are generated, access to the original stream of data records is not necessary. Preferably, a tree-type data structure is utilized. The tree-type data structure is arranged relative to a root. The root of the tree is the first node in the tree. It has no parent node and no sibling nodes. Directly related to the root of the tree are labels of a first level. Labels of a second level and then labels of succeeding levels may follow, as required. Each level includes multiple nodes corresponding to the arrangement of the data. Each node has an array of accompanying cells in which the aggregates of the data values are stored. As the cross-tab report is modified, the tree-type data structure is also correspondingly modified by either changing the pointers between levels and nodes or by rearranging the levels. The aggregate values are then updated accordingly. A cross-tree is also maintained with the same structure as the main tree except that the cross-tree does not include the side label levels or nodes. When the labels of the cross-tab report are rearranged or removed, preferably the data structure is modified in place. Alternatively, a separate data structure may be constructed from the original data structure.

DETAILED DESCRIPTION OF THE PREFERRED EMBODIMENT

DEFINITIONS

Figure 1:
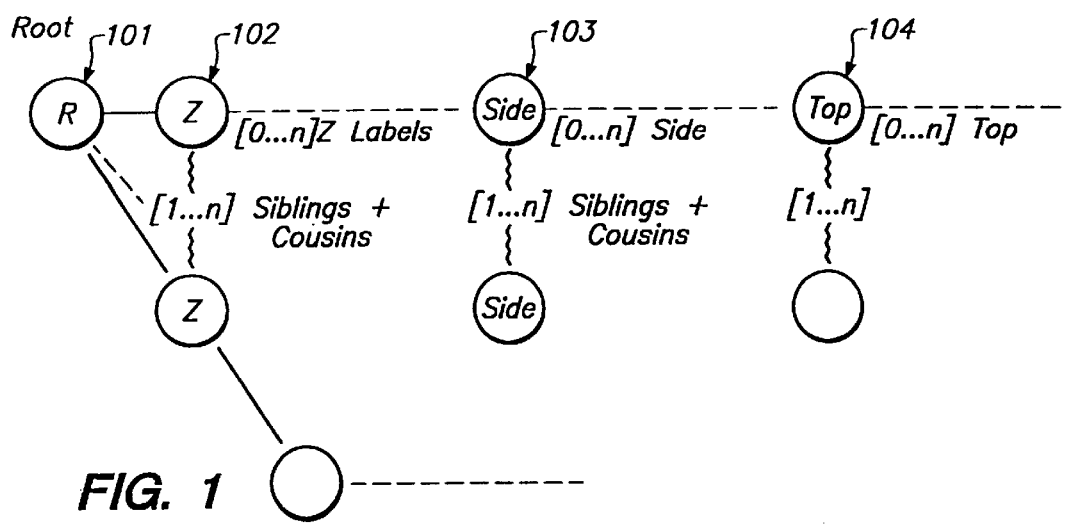
FIG. 1 illustrates the structure of the master tree corresponding to the cross-tab report to be generated.

The following definitions are helpful to the understanding of the present invention.

Label

Labels are the categories by which data is grouped in a cross-tab report. When the cross-tab report is displayed in a rectilinear format, the labels appear on the top and side of the report. In the example above, referred to as Report 1, the top labels are year and quarter and the side labels are winery and grape.

Fact

Facts are the data items which are aggregated in a cross-tab report. When the cross-tab report is displayed in a rectilinear format, the facts appear in a central matrix of the report. In the example above, referred to as Report 1, the facts represent the number of cases sold.

Rectilinear

A rectilinear format or display is one which resembles a standard spreadsheet. Labels appear on the top and sides of the report, and facts appear in the central matrix of the report.

Streaming

Streaming refers to the process of reading portions of the available data, processing it, and then flushing it from memory before reading the next portion of the available data. This technique allows the program to handle much larger amounts of data than will fit into memory at one time.

Record

A record is a collection of data where each element, or field, has a predefined type. Records are used in groups of one or more records all of which have the same structure. Table 1 above, is a group of 144 records which are used to generate the cross-tab Report 1 and Report 2.

Column

A column is a collection of all of the fields of the same type in a record set. The terms rows and columns follow from the fact that data is frequently represented as a 2-dimensional array where each record is a row in the array.

Record Set

A record set is a collection of records from the same data set. All records in the set must have the same structure. Table 1 above represents a record set.

Field

A field is a component of a record. Each field has a name and a type. In Table 1 there are five fields including year, quarter, winery, grape and cases sold.

Row

A row is another term for a record in a record set. The terms row and column follow from the fact that data is frequently represented as a 2-dimensional array where each record is a row in the array.

Relation

A relation is a collection of records which are represented as a 2-dimensional array. Each row in this array is a record. Thus, all of the data in each column is of the same type.

Null

A Null is a field in a record which is empty. Nulls do not have any value, and must be treated specially when taking average values or performing other such calculations.

Z Labels

A Z label is a label along the z-axis of the graph, if the top and side labels are the x and y axes, respectively. The z-axis will then allow the user to view a slice of the data shown in the x/y plane. Z labels allow a user to view a slice of the data by only showing the aggregate facts associated with a certain value. For example, "Year" could be used as a Z label, allowing the user to view the number of cases sold for 1991 and 1992 separately, rather than viewing the total number of cases sold for both years.

Level of Tree

The level of the tree is determined by counting the number of links from a node of interest to the root. In the pivot tree, described below, a node's level is equal to the number of parents minus one because the root is not counted. Note that all nodes on a given level correspond to the same label; conversely each label has all of its nodes on the same level.

Cousin Nodes

A cousin node is a node which is on the same level of the tree, but which may or may not share a common parent node. All nodes corresponding to the same label are cousins.

Top labels

Top labels are those labels which are usually displayed along the top of the cross-tab report. However, "top labels" can actually be displayed in an alternate location, for instance along the bottom of the report. The term top label therefore refers to a group of labels, rather than labels which are always physically displayed in the same location.

A cross-tab report may have 0 or more top labels. If the report has more than 1 top label, the outermost top label may be referred to as a super label, while the inner labels are sub labels.

Side Labels

Side labels are those labels which are usually displayed along the side of the cross-tab report. However, "Side labels" can actually be displayed in an alternate location, for instance along the bottom of the report. The term side label therefore refers to a group of labels, rather than labels which are always physically displayed in the same location.

A cross-tab report may have 0 or more side labels. If the report has more than 1 side label, the outermost side label may be referred to as a super label, while the inner labels are sub labels.

Tree

A tree is a data structure used in computer programs. It is composed of a root node which has no parent node and no sibling nodes. The root may have child nodes. In addition, the tree may contain one or more additional nodes, including any children of the root. Each additional node in the tree has exactly one parent node. All nodes in the tree may have one or more child nodes. All of the nodes in a tree are connected to the root node via one or more levels of hierarchy. Although it is customary to refer to the Root of the tree as the top level of the tree and other levels as being subordinate to the root, trees may be drawn in a variety of ways. The trees in the figures are drawn with the root node on the left and the subsequent levels of hierarchy from left to right.

Root

The root of the tree is the first node in the tree. It has no parent node and no sibling nodes.

Node

A node is a component of a tree which has a parent node and one or more child nodes. In some computer systems, nodes also keep track of their sibling nodes.

Leaf (Node)

A leaf is a node in a tree which has no child nodes.

Interior Node

Interior nodes may also be referred to as non-leaf nodes. An interior node is a node which has one or more child nodes.

Parent (Node)

A parent node is a node which has one or more nodes connected subordinate to it in a tree. A Parent of a particular node is that node which is connected directly superior to the node in question. Except for the root node, all nodes in a tree have exactly one parent.

Child (Node)

A child node is a node which has a node connected superior to it in a tree. Except for the root, all nodes in a tree are child nodes. A Child of a particular node is a node which is connected directly subordinate to the node in question. Nodes may have zero or more children.

Sibling (Node)

Sibling nodes are all nodes which share a common parent. A sibling node is a node which shares a common parent with the node in question. Nodes may have zero or more siblings. In the system described below, all sibling nodes are also cousins.

Cell

A cell is a data structure used by the system described below to store aggregate values of fact data. Each cell contains an aggregate value, the count of rows contributing to that value, and the number of rows with null values included in the row count.

Left/Right Most Child

For convenience, the child nodes of a node may be ordered. The first child in order is considered to be the Left Most Child. The last child in order is considered to be the Right Most Child.

Variable

A variable is a value within a computer program which may be modified by the program to contain different values as the program executes. The value of variables is often, but not always, determined by the inputs to the program.

Master Tree Structure

The new pivot algorithm utilized in the present invention is based upon the use of a tree structure which stores aggregate data gathered from a record source. The structure of the tree is shown in FIG. 1. The first node is the root of the tree 101. Each level of the tree contains nodes which represent a single label or column in a cross-tab report. The levels are arranged such that directly after the Root are any "Z Labels" 102, after any Z-labels 102 are any Side Labels 103 and after the Side Labels 103 are any Top Labels 104. Within each section the labels are arranged so that the outermost labels come first. The other labels for the section follow in order until the innermost label is represented by a level of nodes.

Figure 2:
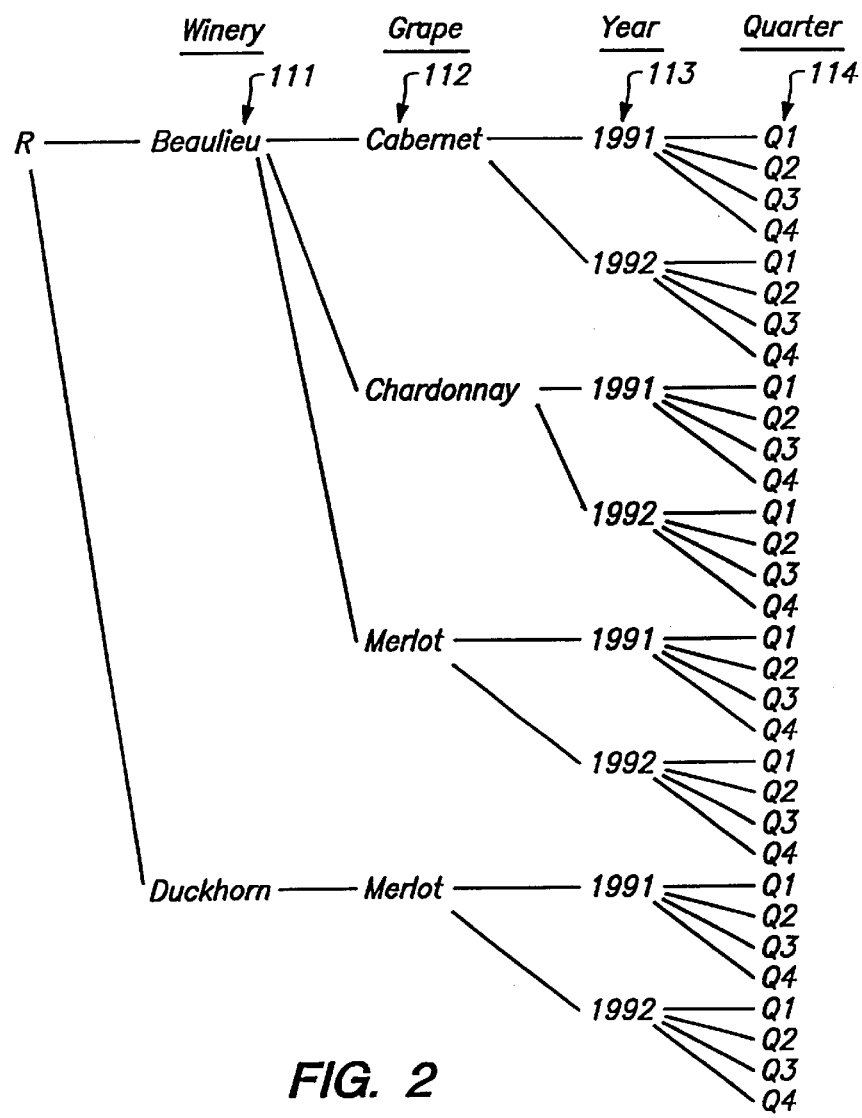
FIG. 2 illustrates an example master tree formed from the sample data included in Table 1.

An example tree based upon the sample data used above is shown in FIG. 2. For the sake of simplicity, no Z labels are shown in the example. The winery side label 111 and the grape side label 112 follow the root 110. The top labels of year 113 and quarter 114 then follow the side labels.

Figure 3:
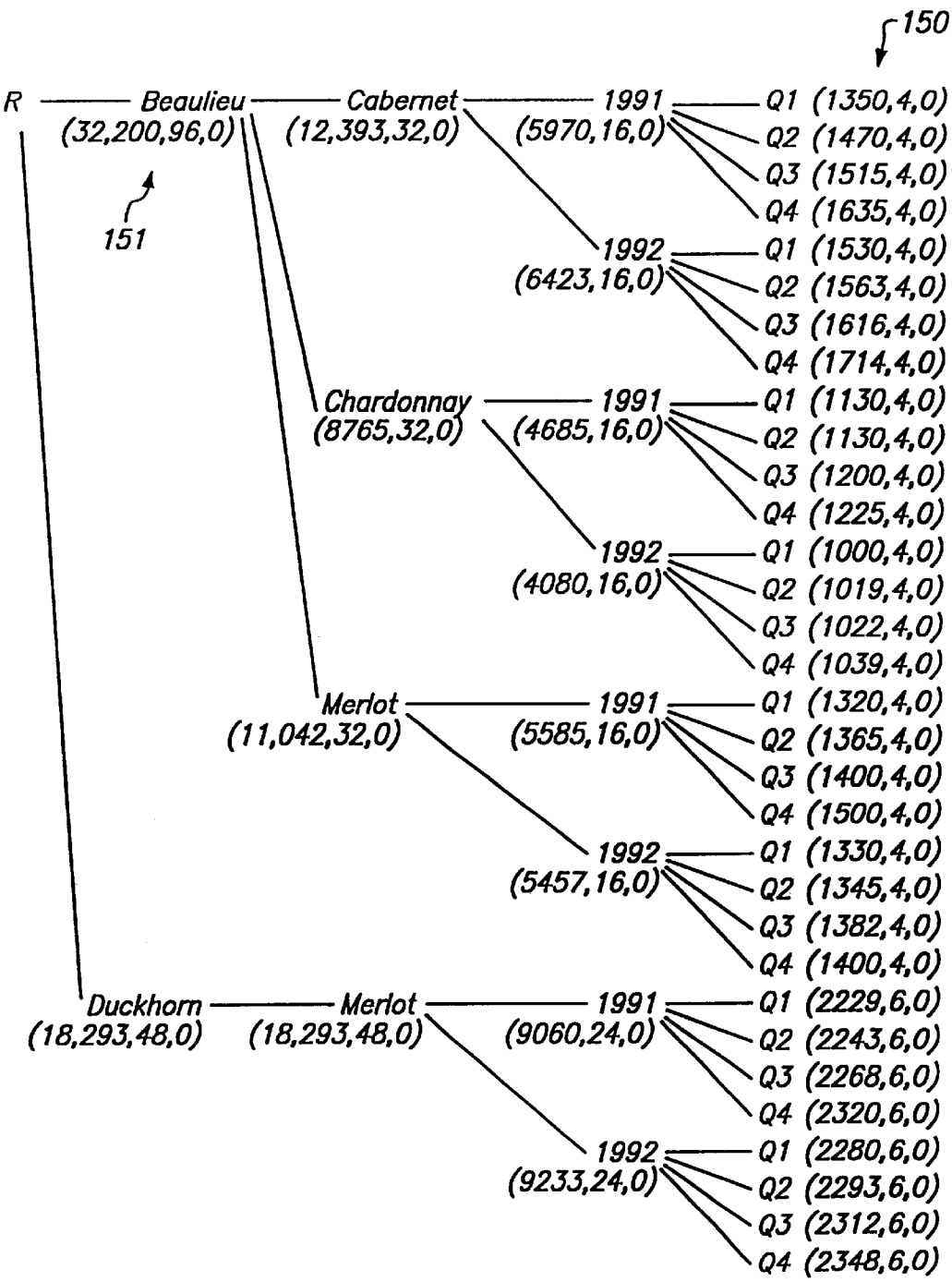
FIG. 3 illustrates the example tree of FIG. 2 with fact cells added for the fact number of cases sold.

Within each level are nodes which each contain an array of cells for storing an aggregate value for each fact supported by the tree. These cells contain the aggregate of all the values for the given fact, the number of rows used to produce this aggregate, and the number of rows which contain a Null value for the fact which are included in the aggregate. FIG. 3 shows the example tree of FIG. 2 with fact cells added for a single fact, "Cases Sold," as illustrated in the examples above. The cells are shown in parentheses near each respective node. The two cells 150 and 151 are illustrated. The cell 150 includes the value 1350, the number of rows 4 and the number of Nulls 0. The cell 151 includes the value 32,200, the number of rows 96 and the number of Nulls 0. The basic cross tab report represented by this tree is shown above in the Report 1.

Figure 4:
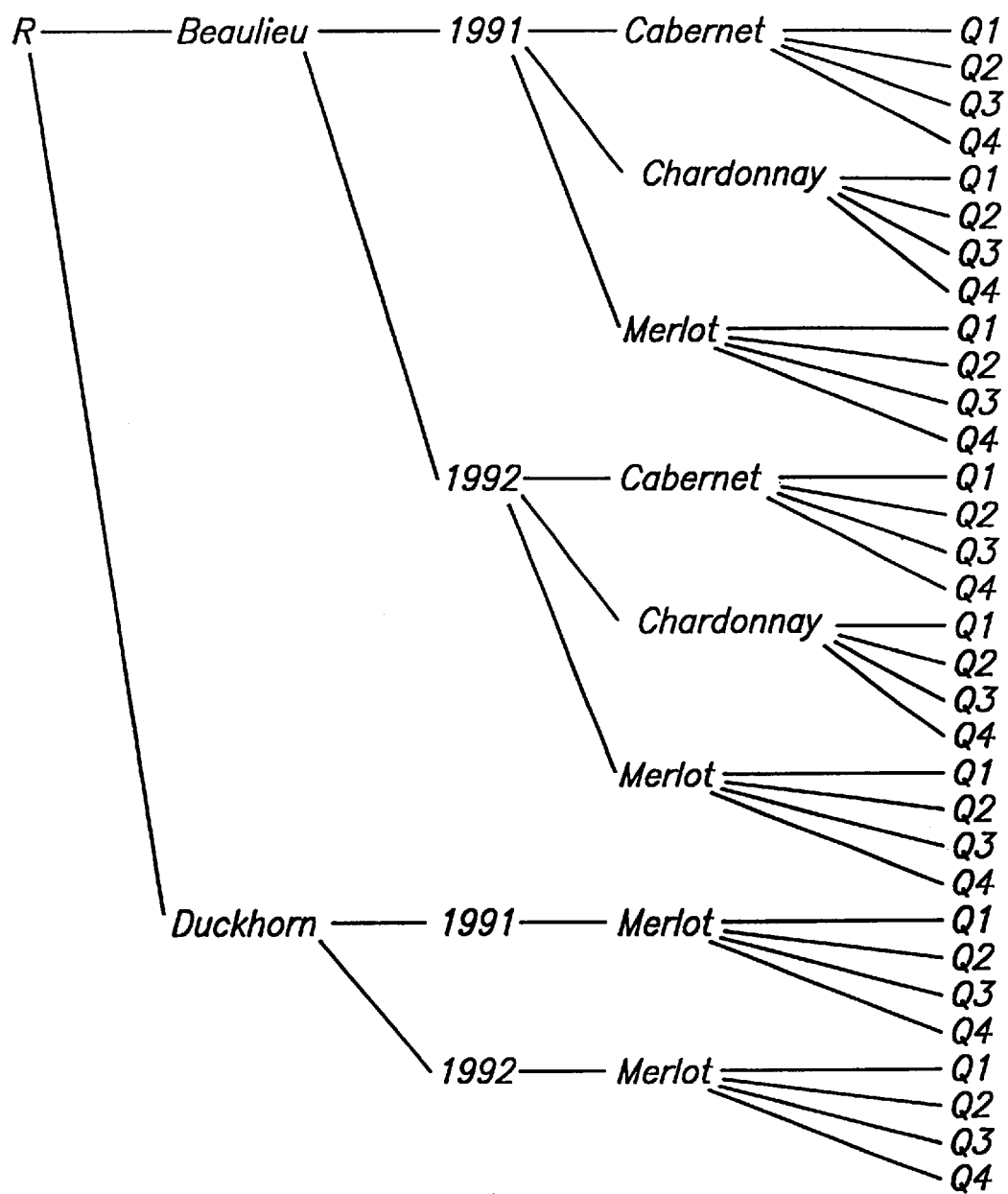
FIG. 4 illustrates a modified tree structure corresponding to the cross-tab report included in Report 2.

The cells within the tree contain the aggregate data which is used to build the cross-tab report. Should the user desire to pivot or rearrange the labels of the report, the structure of the report is changed and a new report generated simply by forming a new tree in which the levels of the tree have been rearranged to reflect the new report structure. Specifically, the level of the tree which corresponds to the label being moved is relocated within the tree so that it corresponds to its new location. A tree structure representing the cross-tab report shown above in the Report 2 is illustrated in FIG. 4. Specifically, the year label has been moved from a top label to a side label within both the tree structure and the cross-tab report. It should be noted that the tree always has the same number of leaf nodes regardless of how the labels are arranged. Furthermore, the same label set will always produce the same fact data at the leaf nodes, although the nodes may occur in a different order. The leaf nodes represent the last level within the tree structure.

Most real data sets contain many rows which are aggregated for each entry in a cross-tab report. The method and apparatus of the present invention accumulates the aggregate values as the data is input, building the tree structure from the data. When a cross-tab report is desired by the user, the present invention will generate the desired cross-tab report from the tree-structure or modify the tree structure to generate the appropriate cross-tab report. Thus, the original stream of data does not have to be re-accessed in order to generate a cross-tab report. Manipulating the tree is considerably faster than scanning all of the source data. The cross-tab report is then generated from the aggregate values of the modified tree.

Figure 5:
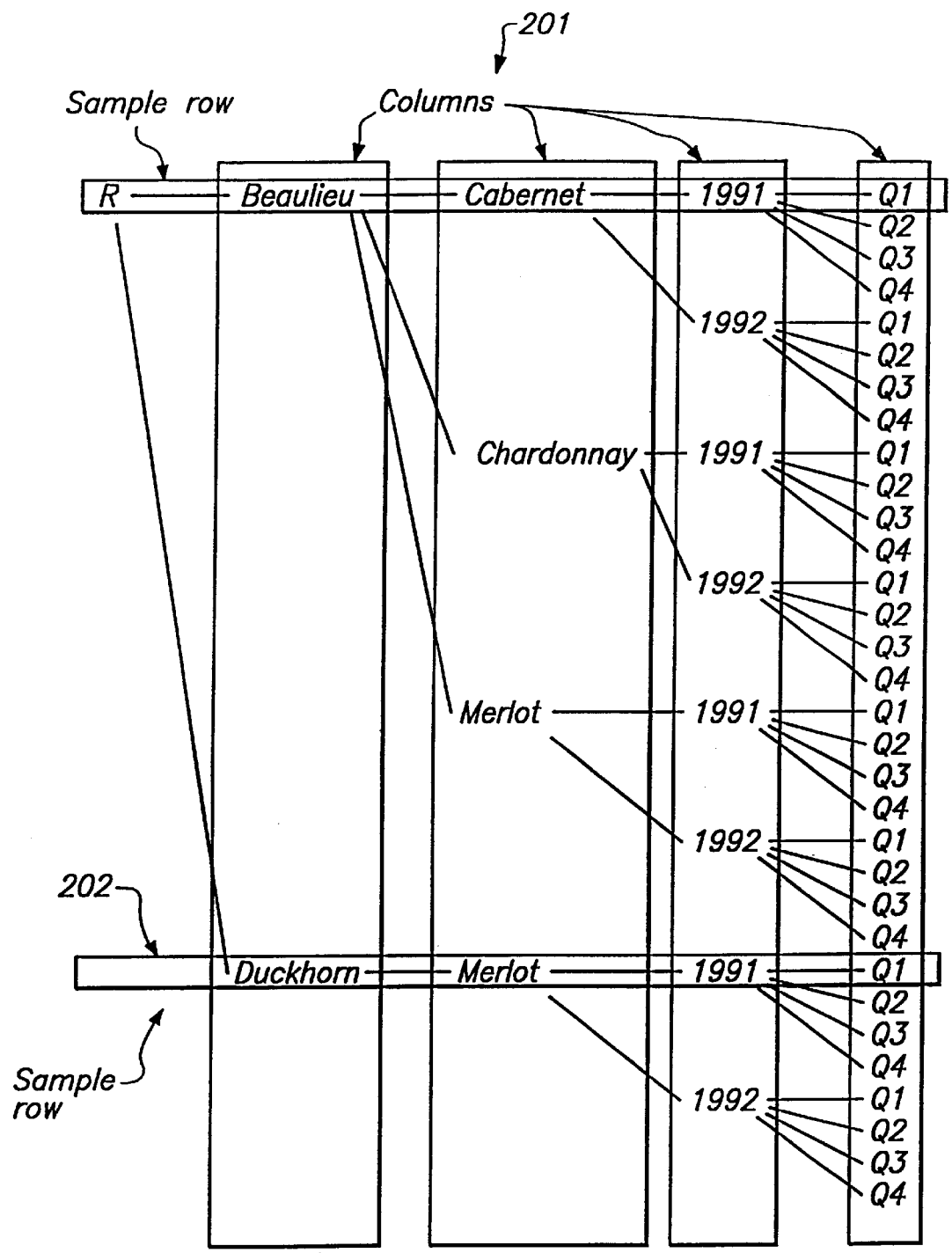
FIG. 5 illustrates an example of the master tree structure with row and column boxes showing the relation of the data within the tree structure.

The tree structure of the present invention may be considered to represent the aggregate data in a relation form. When the tree is drawn from left to right so that the root is on the left and the levels of the tree progress to the right, a series of boxes may be drawn around each level of the tree to represent the columns of the source data and another series of boxes may be drawn around each path from the root of the tree to each leaf node to represent the aggregate of the related rows within the report. Such a tree structure is illustrated in FIG. 5 including the columns 201 and the selected rows 202.

Cross Tree Structure

Figure 6:
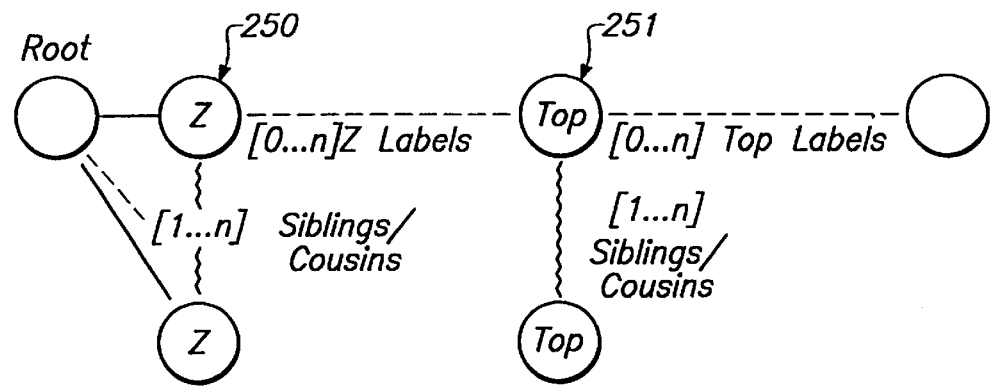
FIG. 6 illustrates the structure of the cross tree of the present invention.
Figure 7:
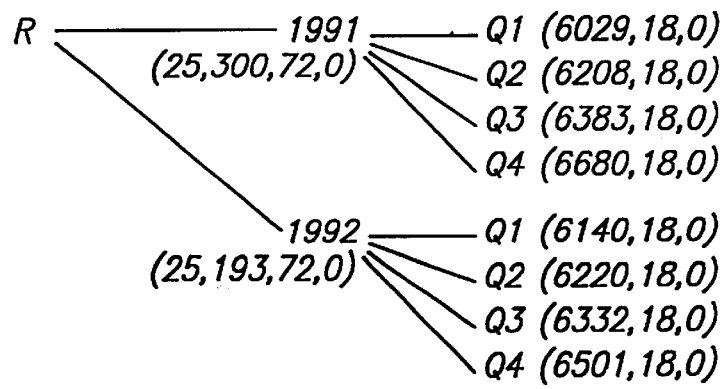
FIG. 7 illustrates the cross tree corresponding to the master tree illustrated in FIG. 2.

In addition to the master tree, a "cross tree" is also maintained by the present invention. The cross tree has the same structure as the master tree, except that it does not contain the levels for the side labels. FIG. 6 shows the structure of the cross tree. The cross tree has the same Z labels 250 as the master tree. It also has the same top labels 251 as the master tree. FIG. 7 shows the cross tree that is produced for the example tree illustrated in FIG. 2. It should be noted again that no Z-labels were used in this example. This cross tree is used to determine which of the top labels have corresponding fact data. Only those labels which have underlying data are shown in the report. The cross tree also contains the aggregate data for the top labels. This data may be used to produce columnar totals if desired.

Tree Maintenance and Manipulation

Many of the steps of building and updating the master tree depend upon the ability to add, remove and rearrange levels within the tree. The preferred method for altering the levels of the tree is to do so in place so that a single tree is modified. The current best mode of implementation in the program code of Appendix B forms a second tree with the desired structure from the original tree.

Tree Formation

Figure 8:
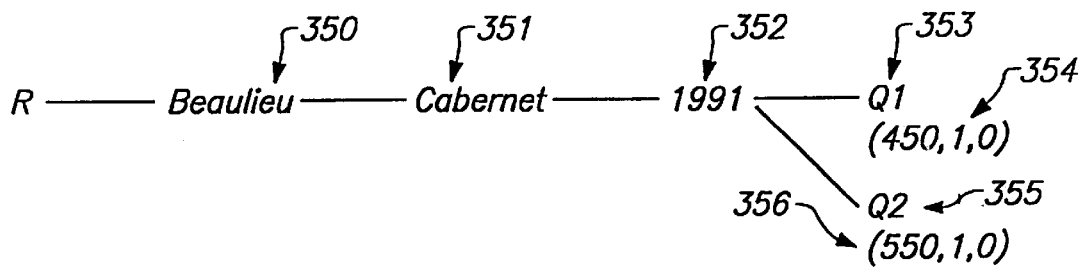
FIG. 8 illustrates an example of tree formation from a stream of data.

To form the tree shown in FIG. 2 the data stream included in Table 1 above is read by a computer system. The tree is formed incrementally as the stream of data is read. The label structure of the tree is known beforehand. In the example tree, the labels are ordered Winery, Grape, Year, Quarter. As each row of data is read, the tree is scanned in this order and new Label nodes are formed as necessary. An example of tree formation from the sample data is shown in FIG. 8. The first row of data includes the values 1991, Q1, Beaulieu, Cabernet and 450 for their respective columns, as illustrated in Table 1 above. For this row, a Beaulieu node 350 is formed in the first level. The node 350 is given a child node Cabernet 351, which gets a child node 1991 352. The last child node Q1 353 is added in the fourth level. The cell for this leaf node 354 is updated to include the aggregate information (450, 1, 0) indicating that the fact "Cases Sold" has a total value of 450 which was generated from 1 row of data with no Null data.

The next row of data includes the values 1991, Q2, Beaulieu, Cabernet, 550 for their respective columns. For this row, the Beaulieu 350, Cabernet 351, and 1991 352 nodes already exist so they are simply traversed. The Q2 node 355 is then added. The cell 356 for Q2 is updated to include the aggregate information (550, 1, 0) indicating that the fact "Cases Sold" has a total value of 550 which was generated from 1 row with no Null data. This process is repeated until all the rows have been processed, adding nodes to the tree-structure and total aggregate values as necessary. Once all the data has been read and the tree is complete, the fact values for interior nodes are calculated by starting at the leaves and aggregating the data for all siblings, setting this as the aggregate value for the parent. This is repeated throughout the tree until all of the nodes have corresponding aggregate fact values.

Labels must be considered in two different ways as the tree is being built. First, the labels must be considered as levels of labels. In FIG. 2 Winery, Grape, Year, and Quarter are all levels of labels. Within each level, the labels have specific values. For example, the labels within the Winery level have the values "Duckhorn" and "Beaulieu." The levels of the labels define the order in which the value of each label is read from each row of data.

Figure 9:
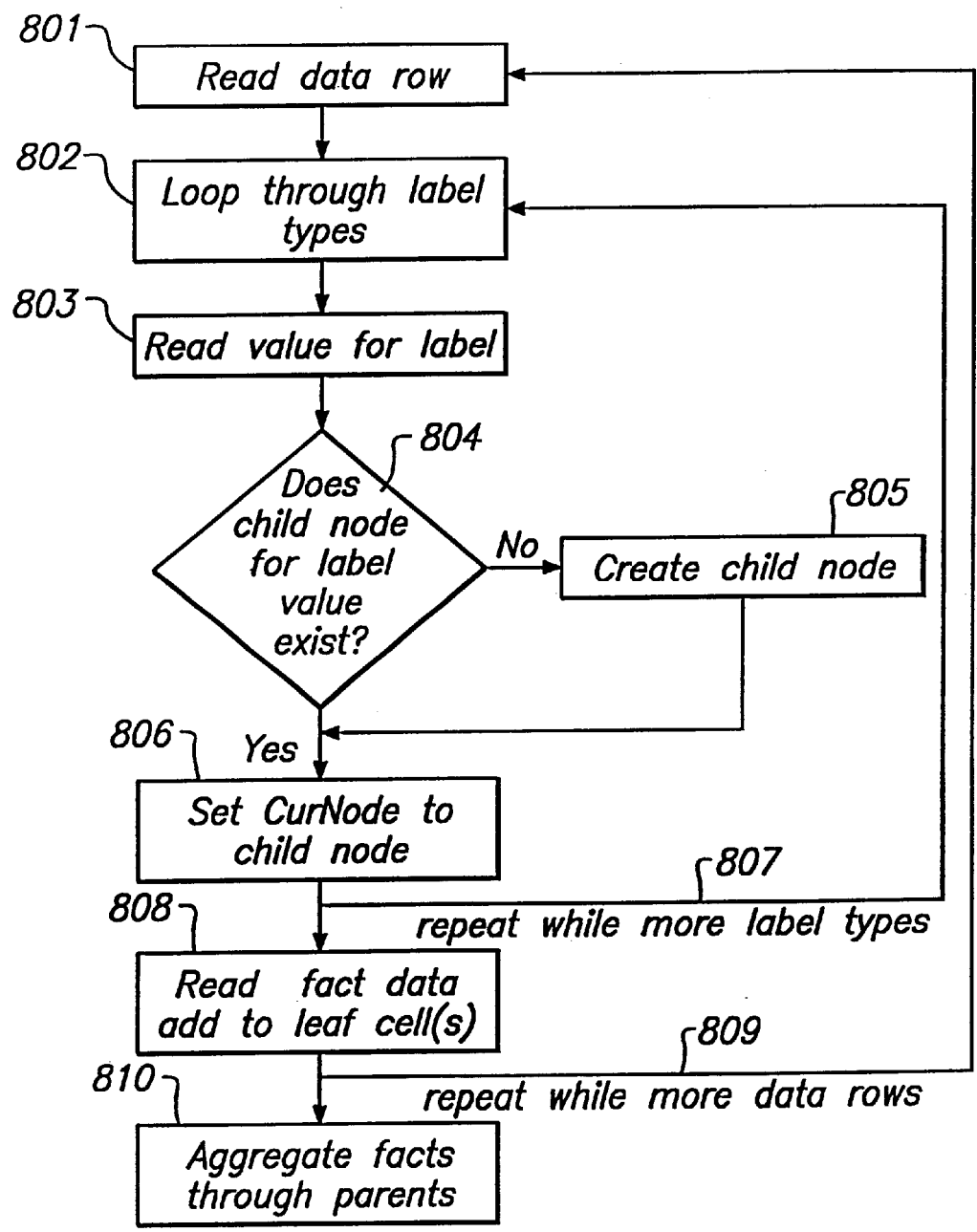
FIG. 9 illustrates a flow chart of the steps necessary to form the tree.

FIG. 9 shows a flow chart of the steps necessary to form the tree. At the beginning of the routine the current node is set to be the root of the tree being processed. The Block 801 is a loop block which reads the data for each row within the stream of data. The end of this loop is represented by the arrow 809. The loop beginning from the Block 801 is repeated until all of the rows of data have been read.

The Block 802 is an embedded loop block which cycles through each of the labels in the order they are to be stored in the tree. The end of this embedded loop is represented by the arrow 807. This loop is embedded inside loop 801. The loop beginning from the Block 802 is repeated until all of the levels of labels within the current row of data have been cycled through. The system then jumps to the Block 803 and reads the value of the label of the current level determined at the Block 802. The system then jumps to the Block 804 which is a decision block that checks to see if a child node already exists which has the same label value as the label value read from the current row of data. If the child node does not already exist the system forms the appropriate node at the Block 805. The Block 805 forms a node for the label value and makes it the child of the current node. After the child node is formed at the Block 805, or if the appropriate child node already existed, the current node is set to be the child node at the Block 806. If there are more labels within the current row, the system jumps back to the Block 802 and repeats the embedded loop for the next level of labels.

Once all of the label values for the current row have been cycled through, the fact data from the current row is read and added to the current leaf node at the Block 808. If there are more rows of data to be read, the system jumps back to the Block 801 and repeats the loop for the next row of data. Once all of the rows of data have been read the facts from the leaf nodes through all of the parent nodes to the root node are aggregated at the Block 810.

Adding a Label

The usual process for adding a label to a tree is almost identical to forming the tree initially. The process can be made slightly more efficient by starting with the original tree. All nodes for labels after the added label must be removed from the original tree. Since the nodes before the new label do not change, they can be left in place and need not be formed again. This partial tree is then used as the starting tree for the algorithm described above in Tree Formation.

It is also possible to defer reading the data if many levels of labels are to be added at once. The levels of labels can all be added and then the data can be scanned only once to find the values for the new labels. Each of the new levels of labels are added to the list of levels of labels to be processed in Block 802. No nodes are formed within the tree until the data is processed.

Removing a Label

Figure 10:
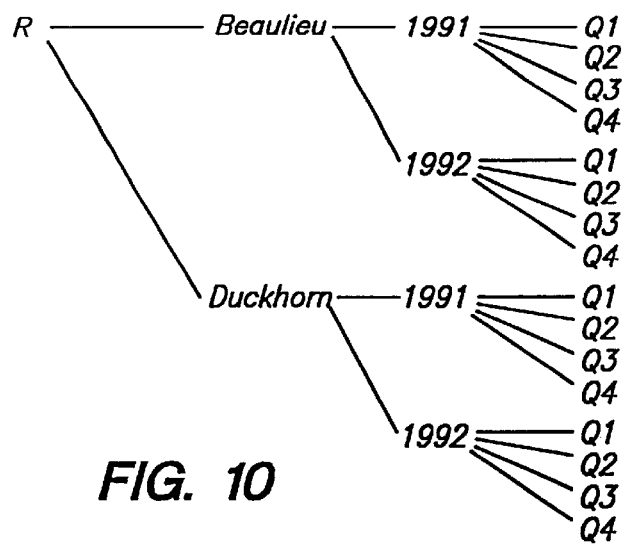
FIG. 10 illustrates the example tree of FIG. 2 with the grape label removed.

Removing a label from the tree does not require re-scanning the stream of data. Ideally, removing a label from the tree can be done in place. The implementation of the present invention described in Appendix B uses another method which will be described below. However, the concept behind in-place removal is briefly described here. FIG. 10 shows the example tree with the Grape level of label removed. The original tree shown in FIG. 2, is altered in order to remove a level while preserving the remaining structure of the tree.

Figure 11:
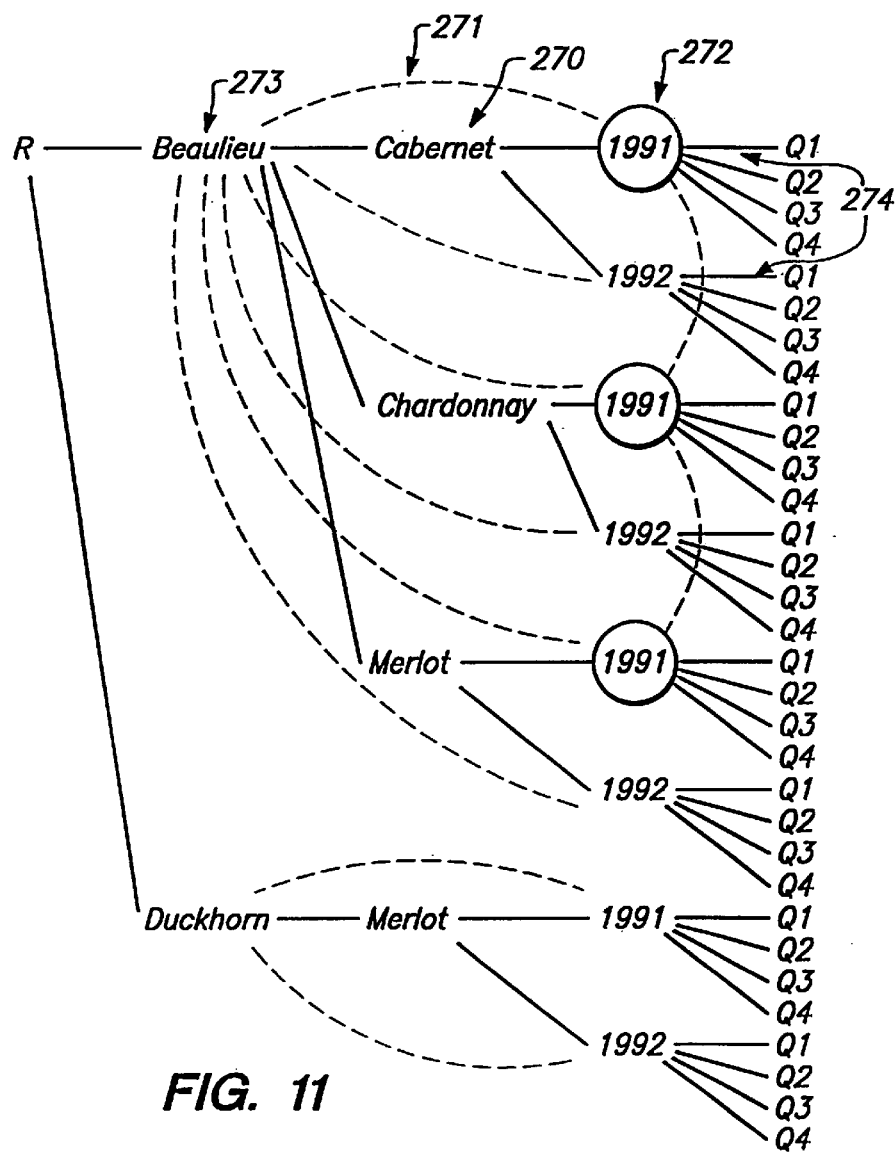
FIG. 11 illustrates an example of moving labels within a tree structure.

The process of altering the original tree will be described using the tree structure shown in FIG. 11. The basic concept is that the parent node 273 of each node which is to be removed 270 must adopt all of that nodes children 274 to be its own. Furthermore, as each child is adopted, children with the same label 272 are merged into a single node. As two nodes are merged, any children they have with duplicate labels must also be merged. The merging process is repeated throughout the children until all duplicates have been merged.

Moving a Label

Figure 14:
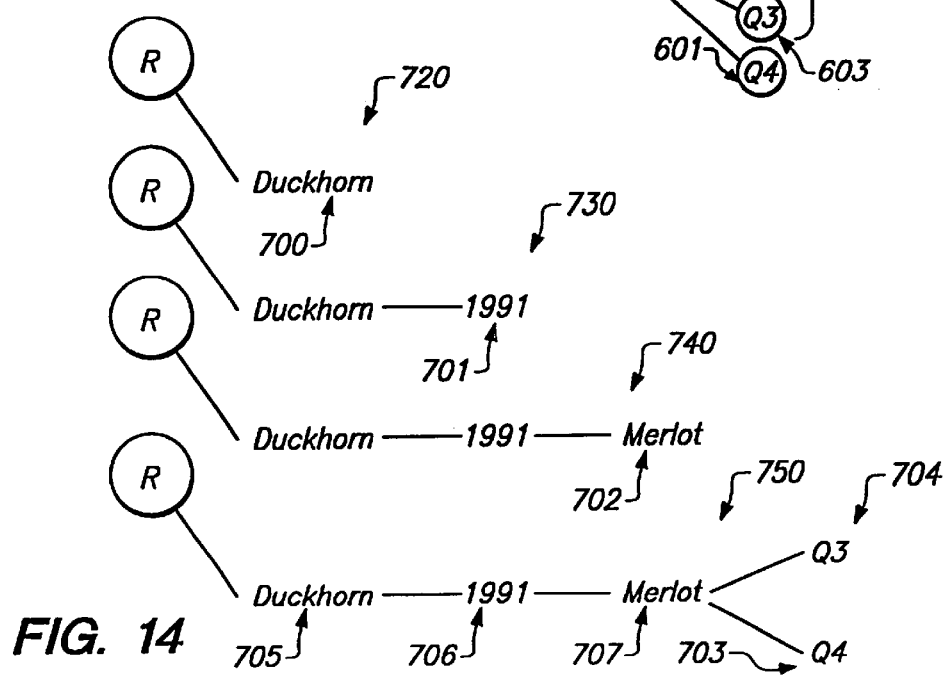
FIG. 14 illustrates the generation of the example tree with the Year label moved to just after the Winery label.

Moving a label within a tree also does not require re-scanning the data. This is due to the fact that the number of leaf nodes is constant regardless of how the labels in the tree are arranged. Rearranging the levels of the labels simply requires reordering the tree so that the new label order is represented in the tree. The preferred method for reordering the tree is to modify the tree in place. FIG. 14 shows the generation of the example tree with the Year label moved to just after the Winery label. The Enhancements section below describes one method for using an auxiliary matrix to facilitate in place modification of the tree.

In-place modification of the tree is difficult to implement. The implementation shown in Appendix B forms a new entire tree from the previous tree with the labels in the new order required. The routine responsible for forming the new tree is PvNode_Spawn, beginning on page 23 of Appendix B. It should be noted that this routine contains hooks for features which are not fully implemented or are not used by the basic algorithm described here. Specifically, tourAscend must always be 0, and, for the sake of simplicity, the nodeType is assumed to include all nodes. (Limiting the node type simply excludes some of the nodes from the copy.) The implementation included in Appendix B also uses this routine to remove a level of labels from the tree. The new tree is simply spawned from the old tree without including the removed label in the specification for the new tree.

Figure 12:
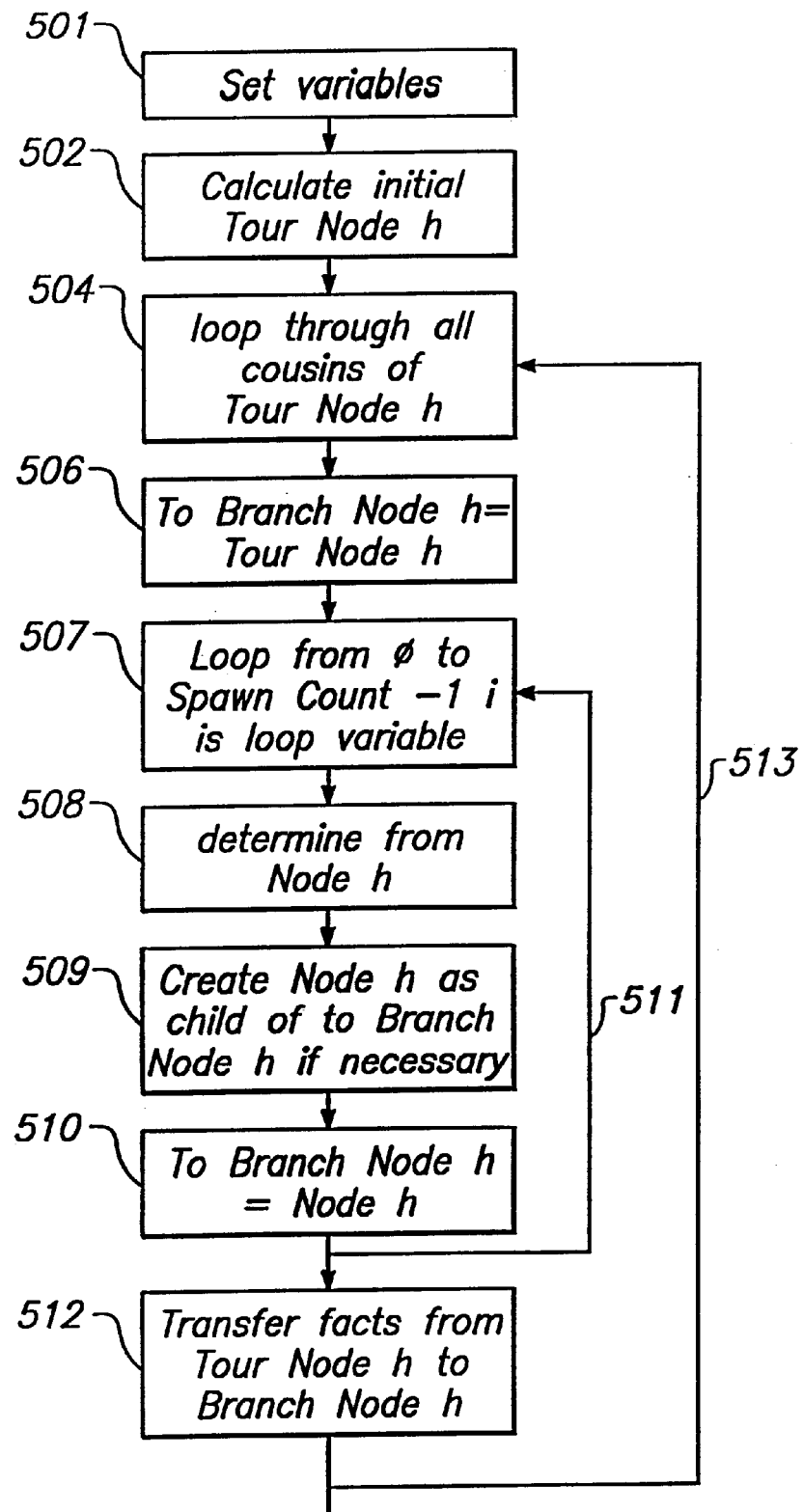
FIG. 12 illustrates a flow chart which describes the generation of a new tree using the spawn routine of the present invention.

FIG. 12 shows a flow chart which describes the generation of the new tree from the spawn routine. The inputs to the flow chart are the root for the original tree, fromRooth, the root for the new tree, toRooth, and an array of the levels of the original tree in the order desired for the new tree, spawnDepthArrh.

The variables spawncount and tourDepth are initialized at the Block 501. Specifically, the variable spawnCount is set equal to the number of elements in the array spawnDepthArrh and the variable tourDepth is set equal to the largest value in the array spawnDepthArrh.

The original value of the node variable tourNodeh is calculated at the Block 502. Starting at the root fromRooth the algorithm moves to the left most child through a number of levels equal to the value of the variable tourDepth.

The Block 504 is an outer loop block. The Block 504 loops through each of the cousins of tourNodeh, setting the value of the variable tourNodeh to each cousin in turn. The end of the loop is represented by arrow 513. The loop beginning with the Block 504 is repeated until all the cousins of the node represented by tourNodeh are cycled through. The variable toBranchNodeh is then set equal to the root toRooth at the Block 506.

The Block 507 is an embedded loop block. The Block 507 loops from 0 to a value equal to the value spawncount−1, setting the loop variable, i, to each value in turn. The end of the loop is represented by the arrow 511. Note that this loop is embedded inside the loop beginning with the Block 504. The embedded loop beginning with the Block 507 is repeated for each value between 0 and spawnCount−1.

The variable fromNodeh is set to equal the nth ancestor of the node represented by tourNodeh at the Block 508, where n is equal to the value of the variable tourDepth minus the current value in the array spawnArrh [i].

A new child for the node represented by the variable toBranchNodeh is formed at the Block 509, if necessary. The new child is a copy of the node represented by the variable fromNodeh. Before it is formed, the system first checks to see if a child with the same properties as the node represented by the variable fromNodeh already exists. If such a child does already exist, the existing child is reused. Otherwise, the child is formed at the Block 509. This child is stored in the variable nodeh.

The value of the variable toBranchNodeh is set equal to the value of the variable nodeh at the Block 510. If the value equal to spawnCount−1 has not been reached the system jumps to the Block 507 and repeats the embedded loop for the next value i. Once the value equal to spawncount−1 is reached the fact information from the node represented by tourNodeh is aggregated into the cells of the new node represented by toBranchNodeh at the Block 512. If all of the cousins of the node represented by tourNodeh have not been cycled through the system jumps back to the Block 504 and repeats the loop for the next cousin. Once all the cousins have been processed the tree is complete.

Figure 13:
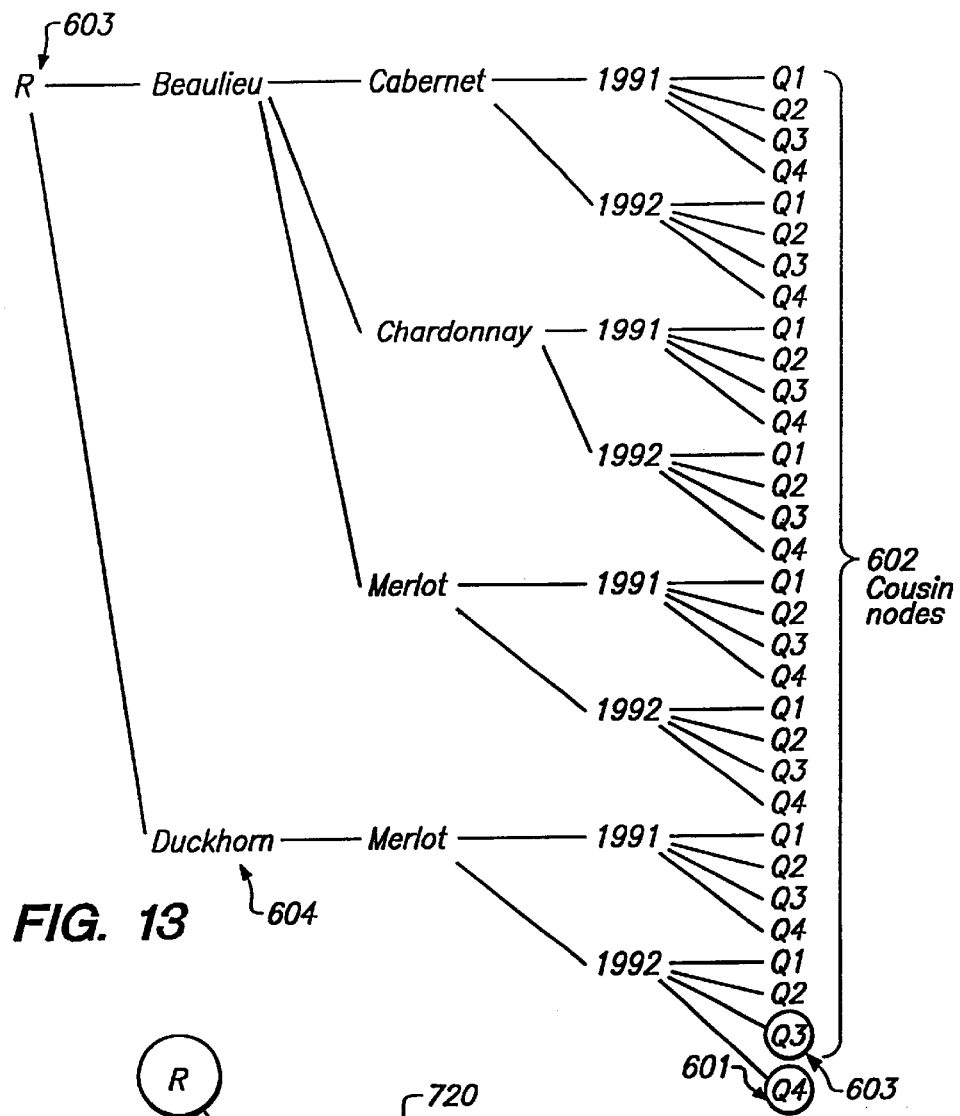
FIG. 13 illustrates which nodes are accessed at various stages of the process of generating a new tree.

The flow chart illustrated in FIG. 12 and described above is better understood by the following example. This example describes how this algorithm forms the tree illustrated in FIG. 4 from the tree illustrated in FIG. 2. The inputs to the flow chart are the root to the tree shown in FIG. 2, a new empty root and the array [0,2,1,3]. The array [0,2,1,3] indicates that the second level is to become the new first level, the first level is to become the new second level, and the other levels are to remain in place. FIG. 13 shows which nodes are accessed at various stages of the process.

The variables spawncount and tourDepth are initialized to 4 and 3, respectively at the Block 501. The original value of the variable tourNodeh 601 is calculated at the Block 502. All of the cousins of the variable tourNodeh are looped through at the Block 504 and subsequent blocks. The cousin nodes 602 will be processed by this loop.

In the first iteration of the loop beginning at the Block 504, the value of the variable toBranchNodeh is set equal to the value of the variable toRooth 603 at the Block 506. The loop beginning with the Block 507 loops through the values from 0 to spawnCount−1, setting the loop variable, i, to each value in turn. The value spawnCount−1 for this example is equal to 3. So the loop iterates from 0 to 3.

The variable fromNodeh 604 is set to be the nth ancestor of the node represented by tourNodeh at the Block 508, where the value n is equal to the value tourDepth minus the value spawnArrh[i]. In the first loop, i is equal to 0, spawnArrh[i] is equal to 0 and n is equal to 3.

A new child for the node represented by the variable toBranchNodeh is formed at the Block 509. This child, nodeh 700, is a copy of the node represented by variable fromNodeh. The variable toBranchNodeh is set equal to the child nodeh 700 at the Block 510. This completes the first iteration of the loop beginning with the Block 507. The new tree now looks like the tree 720 illustrated in FIG. 14. In the next iteration of this loop, the new node for 1991 701 is added. The tree now looks like the tree 730. In the third iteration of the loop, the new node for Merlot 702 is added. The tree now looks like the tree 740. In the last iteration, Q4 is added 703. The tree then looks like the tree 750. The fact information from the old Q4 node 601 to the new Q4 node 703 is then aggregated at the Block 512.

The system then returns to the outer loop block 504 which proceeds to the next cousin 603. The same process is repeated in the inner loop. Existing children are reused. Thus, the nodes for Duckhorn 705, 1991 706, and Merlot 707 are reused in this loop. Only the node Q3 704 is formed. Facts are then added to the new leaf node.

This process is repeated for all cousins until the entire tree has been processed, at which point the new tree will have the desired structure.

Generation of Cross-Tab Report

Figure 15:
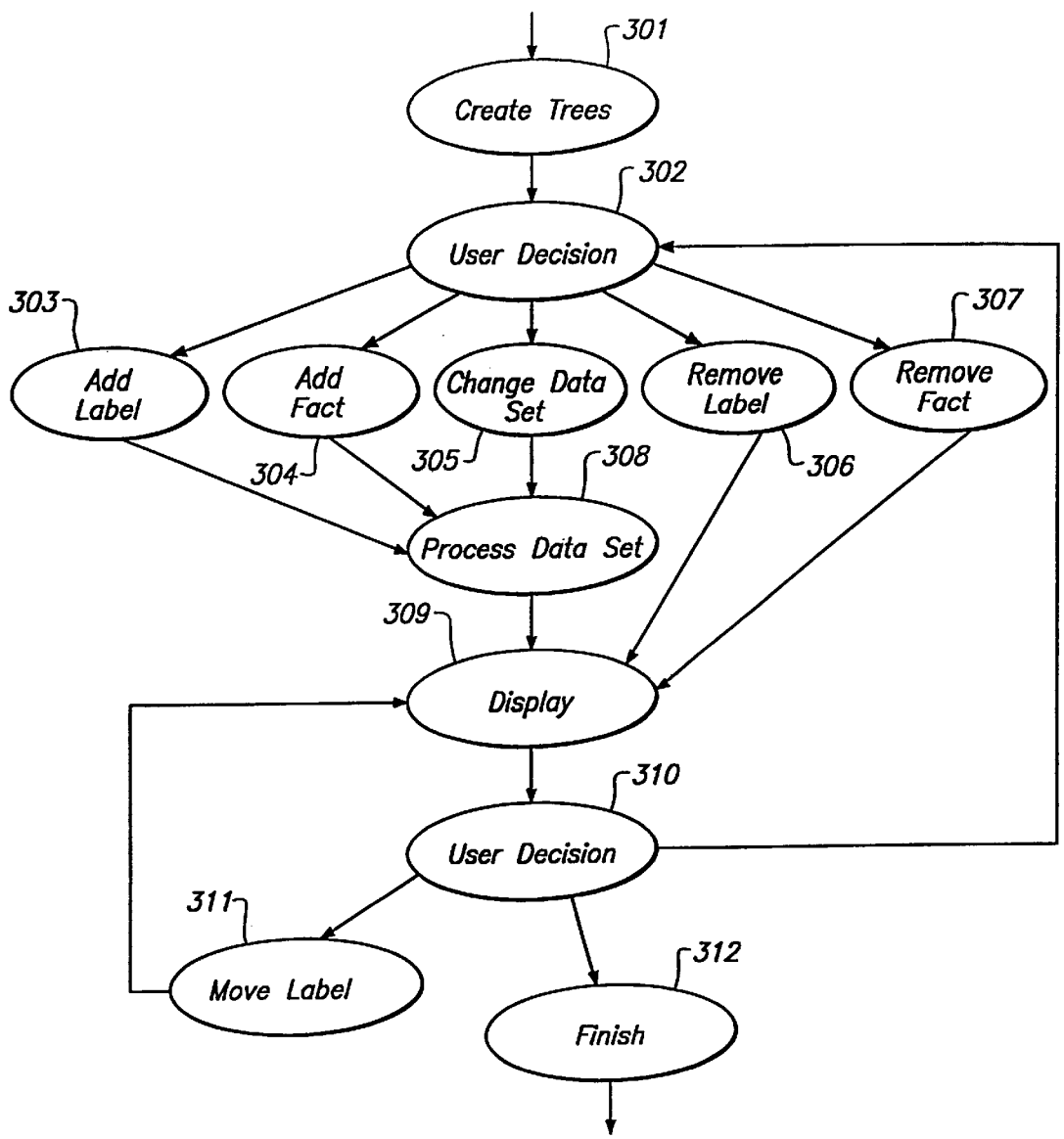
FIG. 15 illustrates the flow chart of the steps for forming a cross-tab report from the tree structure.

The flow chart of FIG. 15 illustrates the flow of the method used to form a cross-tab report from the tree structure. The cross tab data structures are formed at the Block 301. At the Block 301 an empty master tree is formed with a single root node. In addition, an empty cross tree is formed. The root node of each tree is formed as part of the empty tree. The routine PvTbl__Create beginning on page 51 of Appendix B demonstrates this process.

At the Block 302 the user decides between adding a top or side label, adding a fact, removing a label (if one is available to remove), removing a fact (if one is available to remove), or changing the data set. If the user desires to add a label, the system jumps to the Block 303. A label is added to the cross-tab report by adding a new level of nodes at the correct location in the master tree and updating the cross tree as necessary. Note that Z Labels, Side Labels and Top Labels are all added to the cross-tab report in the same manner, but at different locations within the corresponding tree structure. The routine PvTbl__LabelAdd beginning on page 54 of Appendix B demonstrates this process.

If the user desires to add a fact, the system jumps to the Block 304. A fact is added to the cross tab by forming an additional cell at each node in the tree which can hold the data for the added fact. The required data is the aggregate value of all of the rows which make up this node, the number of rows whose value is included in the aggregate, and the number of rows which make up this node and have a null value. The routine PvTbl__FactAdd beginning on page 65 of Appendix B demonstrates this process.

If the user desires to modify the data set used to calculate the values used in the labels and facts the system jumps to the Block 305. The data set can either be completely replaced or data can be incrementally added or deleted. To replace the entire data set, only the new data must be scanned. To incrementally change the data set only the data to be added or deleted must be scanned. Values from the added or deleted rows are simply added to, or deleted from, the aggregate values and labels.

If the user desires to remove a label from the cross-tab report the system jumps to the Block 306. A label is removed from the cross tab by removing the appropriate level of nodes from the master tree and updating the cross tree as necessary. A label is removed from the tree without re-scanning the data set. The routine PvTbl__LabelRemove beginning on page 56 of Appendix B demonstrates this process.

If the user desires to remove a fact from the cross-tab report the system jumps to the Block 307. A fact is removed from the cross-tab report by removing the cells which track this fact from the nodes of the corresponding tree structure. A fact is removed from the tree without re-scanning the data set. The routine PvTbl__FactRemove beginning on page 66 of Appendix B demonstrates this process.

From the Blocks 303, 304 and 305 the system jumps to the Block 308. The data stream is read and the new cross-tab report is produced at the Block 308, based upon the label structure, the fact structure and the data. Note that this step is optional and may be suppressed until all of the labels and facts have been added. Deferring calculation based upon the available data, speeds up label and fact addition because the data can be read once for numerous labels and/or facts. The data may be read by streaming. This allows the cross tab report to accumulate more information than can be stored in the computer system's memory at one time, because the tree aggregates the data as it is read and does not need to store all of the data in memory, simultaneously.

In the system demonstrated in Appendix B, calculation based on the available data may be deferred by not attaching a data stream until after all labels have been added to the tree structure. If data is available, adding a label or fact will cause the system demonstrated in Appendix B to automatically rescan the data.

From the Blocks 306, 307 and 308 the system jumps to the Block 309. The new cross tab report is displayed at the Block 309. Displaying the cross tab is a separate process from aggregating the data in the master and cross trees. Cross tab display can be accomplished in a number of ways as desired by the user. The cross-tab report may be displayed in a rectilinear format as shown in the Reports 1 and 2 above. Appendix B contains code to optimize a rectilinear interface by caching values based on an x,y coordinate system. This interface is not integral to the cross tab engine but is provided as an example of a display mechanism.

In addition, the cross-tab report may be displayed as a 3-Dimensional graph by representing the numeric values in the fact cells as heights in a 3D graph. Furthermore, the cross-tab report may also be used to form a Bar or Horizontal Bar Chart. A Bar Chart is formed by using only Top labels, displayed along the bottom of the chart rather than the top, and representing the fact values as a height of the bars. Similarly, a Horizontal Bar Chart is formed by using only side labels and representing the fact values as lengths in the chart.

At the Block 310 the user may choose either to return to adding or removing labels and facts, to move labels, or to accept the finished cross tab report. At the Block 311 a label is moved within the cross-tab report. The same mechanism is used for moving a label from the top to the side, the side to the top, or within the side or top label area. Note that moving a label does not require re-scanning the data stream.

The label is moved by moving the level of nodes in the main and cross trees that represent this label to the desired new location in the respective trees. The routine PvTbl_LabelMove beginning on page 55 of Appendix B demonstrates this process.

The process is completed at the Block 312. The report is accepted as finished by the user. The underlying data structures which are used to generate the report may then be stored to disk. The storage will include the aggregate information stored in each of the cells. Disk storage is used in order to allow the user to reload the cross-tab report without needing to reload the data. However, the disk storage of the pivot trees is also used as a very fast data warehouse where only aggregate cross-tab report data is needed. Queries to the data warehouse need only rearrange the tree to match the structure of the query and then trace from the root of the tree to the node until the desired cell's aggregate data is read.

Enhancements

The Cross Tab Tree in Matrix Form

The relation form of the cross-tab tree is actually a 2-dimensional matrix. Therefore, the corresponding cross-tab tree structure may also be represented by a unique 2-dimensional matrix. The matrix's structure is such that each level of the tree, as described above, is a column in the matrix. Each row of the matrix is a unique path from the root to a leaf in the tree. The lowest level of the tree is the left most column in the matrix. The root need not have its own column since the root always has exactly one value. The facts of the cross-tab may be stored in separate columns in the matrix, one column per fact. This is possible because the number of rows in the matrix does not change with a given set of labels. This matrix has a 1 to 1 correspondence with the corresponding cross-tab tree structure. Thus, the matrix is generated from the tree and the tree may be generated from the matrix.

Because this matrix has a 1-1 correspondence with the cross tab tree, it may be considered as an alternate representation of the tree. The same principle of reordering the cross-tab report by rearranging the levels of the tree applies to the matrix. The cross-tab report is rearranged by reordering the columns in the matrix and then resorting the columns which have been moved. Aggregate data is read from the matrix by reading the fact values within the matrix.

Furthermore, the matrix may be used as a companion data structure to the corresponding cross-tab tree by storing pointers to the tree nodes in the matrix. The matrix is -then reordered when the report is rearranged and the changed levels of the tree are regenerated from the matrix. This method facilitates in-place reordering of the tree as preferred by the present invention.

Additionally, the matrix may also be used to store the tree to disk. The matrix need not contain pointers, which are difficult to store to disk because they are usually transient in memory. Therefore, the matrix may be written to disk, then read back and used to regenerate the tree if desired.

The Cross Tab Tree in N Dimensions

An alternate way to consider the method described above is to consider that it sorts data in 3 dimensions. In this mode, the Side, Top, and Z Labels each represent a dimension of the data. Multiple Side, Top, and Z labels may be considered to represent composite coordinates that specify a single value in the specified dimension. The method as demonstrated in Appendix B handles these 3 dimensions.

However, the concepts described above may be extended to an arbitrary number N of dimensions. To implement an N-dimensional cross tab, the main pivot tree is formed as described above, including a series of levels of nodes for each of the desired dimensions. In addition, separate cross trees are built depending on the display criteria required for the various dimensions.

In 3 dimensions the main tree is formed with Z labels, Side labels, and then Top labels. The corresponding cross tree contains node levels for the Z labels and then the Top labels. The purpose of the cross tree is to facilitate display of the correct Top labels and aggregate totals for the columns represented by the top labels.

An example 4-dimensional cross-tab report and corresponding tree structure might have Side, Top, Z, and Time labels. The desired display of the data might then be an animated cross-tab report, where the values in the chart varied with time. The master tree would have Z, Time, Side and Top labels. Only a single cross tree is then necessary. This cross tree would contain the Z, Time, and Top labels. Values are then accessed for a given sheet in a given time and displayed under the appropriate side and top labels.

In alternate 4-dimensional or higher dimensional cross-tab reports and corresponding tree structures, different cross trees are chosen based upon which label types must be grouped independently. Furthermore, the structure of the main tree is varied based upon the access criteria.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention.

What is claimed is:

1. A method of using a computer for converting a first cross-tabulated report having a first presentation of a set of a plurality of source data records into a second cross-tabulated report having a second presentation of the set of source data records, wherein each source data record includes a same plurality of fields of data facts, and further wherein the first presentation represents a first relationship between the fields and the second presentation represents a second relationship between the fields, the method comprising the steps of:

a. forming a data structure corresponding to the first relationship including a plurality of aggregating nodes, and relationship data regarding relationships within the data structure between the aggregating nodes;

b. modifying the relationship data corresponding to the second relationship, thereby rearranging the aggregating nodes and changing the relationships within the data structure between the aggregating nodes and updating the corresponding aggregate values according to the second relationship without reaccessing the source data records, thereby forming a modified data structure; and c. forming the second cross-tabulated report from the modified data structure.

2. The method according to claim 1 wherein the first and the second cross-tabulated reports are rectilinear displays.

3. The method according to claim 1 wherein the first and the second cross-tabulated reports are three dimensional graphs.

4. The method according to claim 1 wherein the first and the second cross-tabulated reports are horizontal bar graphs.

5. The method according to claim 1 wherein the first and the second cross-tabulated reports are bar graphs.

6. A method of using a computer for forming a data structure for aggregating original source data in an arrangement that can be directly mapped to a cross-tabulated report having a first presentation of a set of a plurality of source data records, wherein each source data record includes a plurality of fields of data facts, the method comprising the steps of:

a. identifying a root node;

b. identifying a superior field;

c. identifying a next subordinate field and each such successively subordinate field until all desired fields are exhausted;

d. determining relationship data relating to hierarchical relationships between nodes within the data structure and corresponding to the fields;

e. aggregating the data facts for each node; and f. converting the first cross-tabulated report into a second cross-tabulated report having a second presentation of the set of data records without reaccessing the source data records.

7. The method according to claim 6 wherein the first presentation represents a first relationship between the fields and the second presentation represents a second relationship between the fields, the method comprising the steps of:

a. modifying the relationship data corresponding to the second relationship, thereby rearranging the relationships of the nodes within the data structure and updating the corresponding aggregate values according to the second relationship, thereby forming a modified data structure; and b. forming the second cross-tabulated report from the modified data structure.

8. A method of converting a first cross-tabulated report representative of a first plurality of source data records within a computer system including one or more first labels and one or more second labels, wherein the first labels and the second labels are re-arranged and pivoted to form a second differently structured report, the method comprising the steps of:

a. receiving the first plurality of source data records including a second plurality of fields and corresponding values;

b. forming a data structure representative of the first plurality of source data records including one or more first label structures and one or more second label structures and a third plurality of aggregate values representative of the data within the first plurality of source data records; and c. forming a cross-tabulated report from the first label structures on a first coordinate of the report and the second label structures on a second coordinate of the report with corresponding aggregate values of the third plurality of aggregate values displayed within the report;

wherein the second differently structured report is formed without reaccessing the first plurality of source data records, by rearranging and interchanging one of the one or more first label structures and second label structures within the data structure and thereby forming newly corresponding aggregate values within the report for display.

9. The method as claimed in claim 8 wherein the data structure is a tree-type data structure.

10. The method as claimed in claim 9 wherein the tree-type data structure includes a fourth plurality of nodes and a fourth plurality of cells.

11. The method as claimed in claim 10 wherein one of the third plurality of aggregate values is stored within a corresponding one of the fourth plurality of cells.

12. The method as claimed in claim 9 wherein the first label structures are top label structures and the second label structures are side label structures.

13. The method as claimed in claim 12 further comprising the step of forming a cross tree-type data structure which corresponds to the tree-type data structure, but includes only the one or more top label structures and corresponding nodes and cells.

14. The method as claimed in claim 13 wherein the step of rearranging one of the one or more side label structures and top label structures is completed by modifying the tree-type data structure.

15. The method as claimed in claim 13 wherein the step of rearranging one of the one or more side label structures and top label structures is completed by forming a new tree structure by moving and switching the one or more side label structures and the top label structures in relation to each other within the new tree-type data structure.

16. The method as claimed in claim 9 wherein the initial report includes one or more additional labels and the tree-type data structure includes one or more additional label structures.

17. The method as claimed in claim 8 wherein the data structure is a matrix data structure.

18. The method as claimed in claim 8 wherein the initial report includes one or more additional labels and the tree-type data structure includes one or more additional label structures.

19. The method as claimed in claim 8 wherein the first plurality of source data records are received sequentially and the corresponding values added to the appropriate aggregate value without simultaneously storing all of the first plurality of source data records into a memory of the computer.

20. A memory for storing data for access by an application program being executed on a data processing system including a data structure for use on a computer, the data structure corresponding to a first plurality of source data records, each source data record including a second plurality of fields and corresponding values, wherein a structured report having one or more first labels and one or more second labels corresponds to the data structure, the data structure comprising:

a. one or more first level structures corresponding to the first labels and one or more second level structures corresponding to the second labels, wherein the first level structures and the second level structures store appropriate data from the first plurality of source data records;
b. a third plurality of aggregate values representative of the data within the first plurality of source data records;
c. a plurality of nodes;
d. a plurality of cells:

and wherein a modified structured report representation is achieved by changing ordered relationships of the nodes within the data structure without reaccessing the source data records.

21. The data structure as claimed in claim 20 wherein the data structure is a tree-type data structure.

22. The data structure as claimed in claim 21 wherein one of the third plurality of aggregate values is stored within a corresponding one of the fourth plurality of cells.

23. The data structure as claimed in claim 21 further comprising a cross tree-type data structure which corresponds to the tree-type data structure, but includes only the one or more first level structures and the data from the first plurality of source data records stored therein.

24. The data structure as claimed in claim 21 wherein the tree-type data structure includes one or more additional level structures corresponding to one or more additional labels in the structured report.

25. The data structure as claimed in claim 20 further comprising a third level structure corresponding to one or more third labels within the structured report.

26. The data structure as claimed in claim 20 wherein appropriate aggregate values are updated as the first plurality of source data records are received.

* * * * *

UNITED STATES PATENT AND TRADEMARK OFFICE
CERTIFICATE OF CORRECTION

PATENT NO. : 6,321,241 B1
DATED : November 20, 2001
INVENTOR(S) : Gartung et al.

It is certified that error appears in the above-identified patent and that said Letters Patent is hereby corrected as shown below:

<u>Title page,</u>
Item [54], delete "CROSS TAB ANALYSIS AND REPORTING METHOD" and replace with -- CROSS TAB ANALYSIS AND REPORTING METHOD UTILIZING A TREE STRUCTURE AND AGGREGATED DATA --.

Signed and Sealed this

Eighteenth Day of June, 2002

*Attest:*

*Attesting Officer*

JAMES E. ROGAN
*Director of the United States Patent and Trademark Office*